United States Patent [19]

Bassignani

[11] 4,006,842
[45] Feb. 8, 1977

[54] MATERIAL MEASURING AND DISPENSING DEVICE

[76] Inventor: Anthony L. Bassignani, 17 King St., Norfolk, Mass. 02056

[22] Filed: Sept. 18, 1975

[21] Appl. No.: 614,702

Related U.S. Application Data

[63] Continuation-in-part of Ser. No. 466,732, May 3, 1974, Pat. No. 3,907,166.

[52] U.S. Cl. .............................. 222/43; 222/436; 222/473
[51] Int. Cl.² ....................................... G01F 11/28
[58] Field of Search ........... 222/284, 436, 428, 43, 222/472, 473, 474

[56] References Cited

UNITED STATES PATENTS

| | | | |
|---|---|---|---|
| 661,546 | 11/1900 | Meyers et al. | 222/43 |
| 2,983,408 | 5/1961 | Schwartz | 222/284 |
| 3,007,612 | 11/1961 | Tepper | 222/284 |
| 3,307,749 | 3/1967 | Ursetta | 222/473 X |

Primary Examiner—Stanley H. Tollberg
Assistant Examiner—Hadd Lane
Attorney, Agent, or Firm—Edgar H. Kent

[57] ABSTRACT

A measuring and dispensing device for granular material has a container for the material with an outlet at the bottom and a plurality of dispensing compartments open at top and bottom fixed at the outlet. A barrier member and a closure member are reciprocable in unison across the tops and bottoms respectively of the compartments so that on movement of the members in one direction the barrier member closes the top of each successive compartment before the closure member closes its bottom, and on movement thereof in the opposite direction the closure member opens the bottom of each successive compartment before the barrier member opens its top. Control means are provided accessible from the exterior for selectively stopping the movement of the members at each position of respective registry with the successive compartments. The device can be adjusted to selectively fill and then dispense the compartments maintained normally empty, or to selectively dispense the compartments maintained normally full. The members may be pivoted about an axis and operated by one hand holding the device by a handle.

8 Claims, 10 Drawing Figures

MATERIAL MEASURING AND DISPENSING DEVICE

CROSS-REFERENCE TO RELATED APPLICATION

This application is a continuation-in-part of my U.S. patent application Ser. No. 466,732, filed May 3, 1974, now U.S. Pat. No. 3,907,166, issued Sept. 23, 1975.

BACKGROUND OF THE INVENTION

1. Field of the Invention

This invention relates to devices for measuring and dispensing granular materials, particularly for domestic use.

2. Description of the Prior Art

Prior devices of the type concerned have commonly utilized a slide provided with a plurality of measuring compartments open at top and bottom. The slide is reciprocated between positions at which the compartments register with an opening in a container for the material to be dispensed located above the slide, for filling the compartments, and other positions in which the slide closes the opening in the material container and exposes the open bottoms of the compartments to an outlet, so that the material therein is dispensed. Such devices may also have externally operated adjustment means for selectively stopping the slide at different positions, so that any selected number of compartments can be both filled and dispensed at a slide operation to dispense a selected quantity indicated by the setting of the adjustment means. Devices as described are disclosed, for example, in U.S. Pat. Nos. 2,002,039 and 2,983,408 and in my aforesaid application.

My aforesaid application, however, discloses as its preferred embodiment a different structure wherein the measuring compartments, open at top and bottom, are fixed at a filling opening thereto from the material container and a dispensing outlet therefrom. To permit selective filling and dispensing of the compartments, reciprocable plate members are provided, a top barrier member movable between the open tops of the fixed compartments and the filling opening thereto to close or open their tops to the container, and a bottom closure member movable between the open bottoms of the compartments and the dispensing outlet to close or open them thereto. The members are coupled together for operation in unison so that on movement of the plate assembly in one direction the top barrier member closes the top of each successive compartment before its bottom is opened by the bottom closure member, and on movement of the assembly in the opposite direction the closure member closes the bottom of each successive compartment before its top is opened by the barrier member. External adjustment means are provided for selectively stopping the movement of the assembly according to the desired number of compartments to be filled and dispensed.

This reciprocable plate member embodiment has advantages over the movable compartment type, particularly in ease of operation especially where relatively large quantities of heavy material are to be dispensed, reduction or elimination of dusting-out of the material being dispensed between relatively movable parts, which creates a jamming problem in the movable compartment type, and simplicity of manufacture. However, the aforesaid application discloses only an arrangement of the reciprocable plate members and adjustable stop mechanism wherein the plate members have a normal or idle position in which all the compartment tops have been opened by the top member and all their bottoms have been closed by the bottom member, so that all the compartments are normally full. To dispense, it is only necessary to move the plate member assembly to a selected position determined by the adjustment means at which the desired number of compartments have their tops closed and their bottoms opened for dispensing.

Such arrangement of the plates is usually advantageous over one, used in some reciprocating compartment types, wherein the compartments are maintained normally empty, so that the user has to operate the reciprocating mechanism first to fill position, wait for filling to take place, then to dispense position. Particularly if the compartments are relatively large, the waiting for fill is tedious and the user may not allow sufficient time for complete filling. Yet in some cases, such as where the compartments are quite small, or the material to be dispensed tends to cake and stick in the compartments on standing for long periods under humid conditions, it may be equally or even more advantageous to utilize the arrangement in which the compartments are normally empty and in which the use of the movable plate members rather than movable compartments would be advantageous.

SUMMARY OF THE INVENTION

Accordingly, it is an object of this invention to provide a modification of the preferred embodiment of my aforesaid application having an arrangement of the plate members in which the fixed compartments are normally empty and the plate members are selectively stopped in different fill positions by the adjustment mechanism.

Another object is to provide such a modification which is readily adjustable to enable the plates and adjustment mechanism to operate in the alternative with the compartments normally full as in my aforesaid application.

Still another object is to provide such a modification with other structural alterations of the preferred embodiment disclosed in my aforesaid application to effect size reduction and facilitate use thereof as a hand-held dispenser for small quantity dispensing.

In attaining the foregoing objects, a dispenser is provided with an arrangement of the plate assembly which in effect interchanges the positions of the top and bottom plates of the plate assembly disclosed in my prior application, so that the normal or idle position of the plates is at full dispense, in which the tops of the compartments are closed and their bottoms are open, so that they are empty. In this arrangement, the adjustable stop mechanism selectively stops movement of the plates toward complete fill, instead of complete dispense, positions. To dispense, the plate assembly is first moved toward fill position until stopped by the stop mechanism or all compartments are exposed for fill, and after a delay sufficient to insure that all compartments are full, is withdrawn to the normal position, thus dispensing all compartments that have been filled.

In the preferred embodiment shown, the operating mechanism can be readjusted so that the compartments will be normally full, and the adjustable stop mechanism will selectively stop movement of the plate assembly from the normally full position of all compartments toward an all dispensed position, as in my aforesaid application. This embodiment also provides a hand-held unit of generally cylindrical shape for small quantity dispensing, in which the plate assembly is oppositely pivoted about an axis instead of being oppositely longitudinally slidable as in my aforesaid application, with resultant size and weight reduction.

DESCRIPTION OF THE PREFERRED EMBODIMENT

Figure 1:
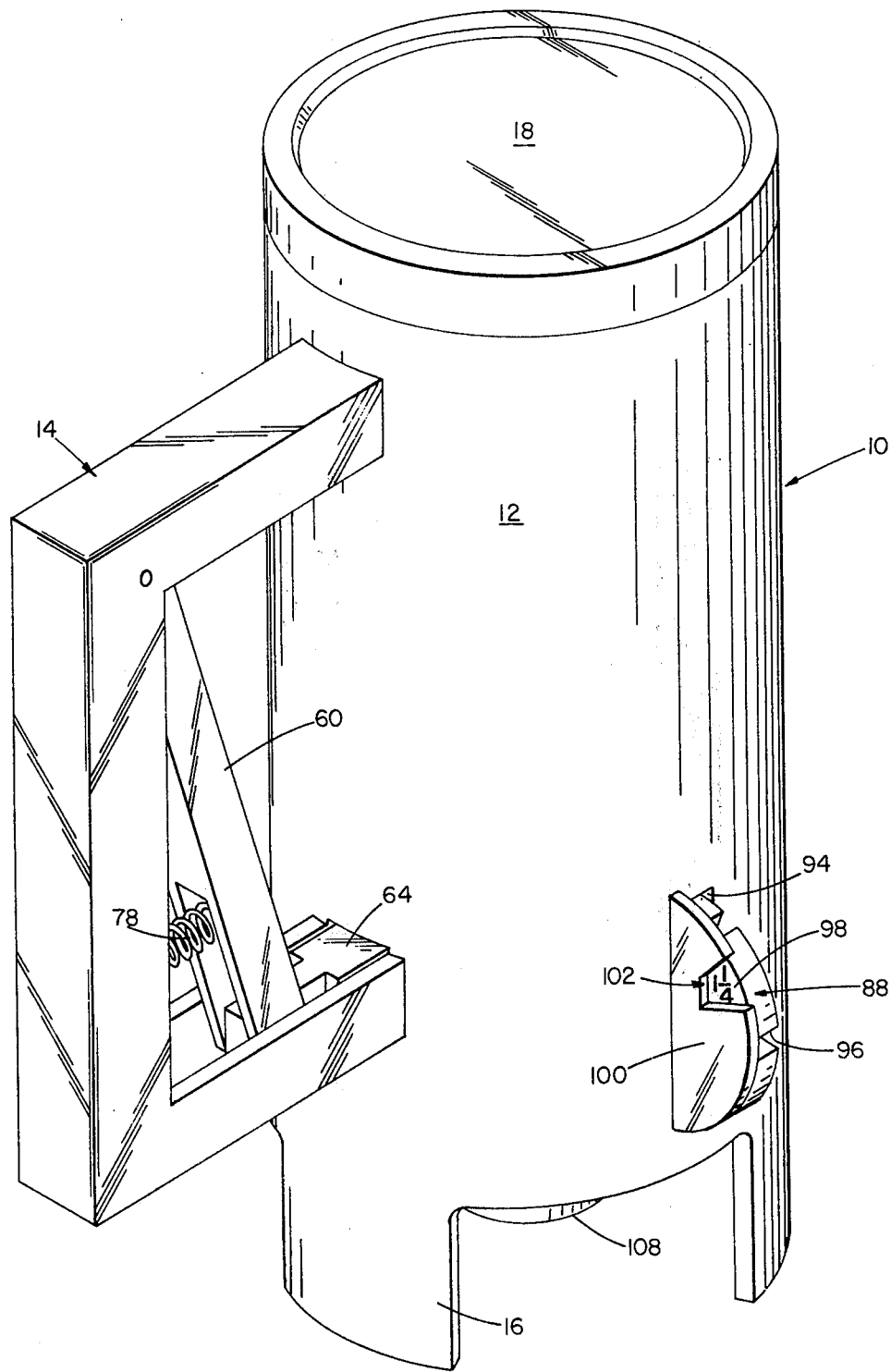
FIG. 1 is a perspective view of the exterior of the preferred embodiment.
Figure 2:
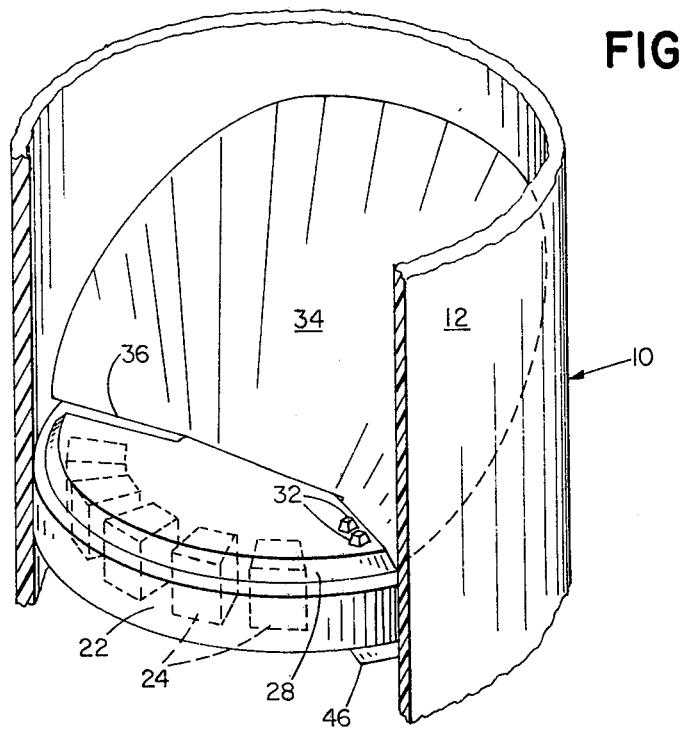
FIG. 2 is a perspective view through a cut-away wall of the interior of an intermediate portion of the device of FIG. 1.
Figure 3:
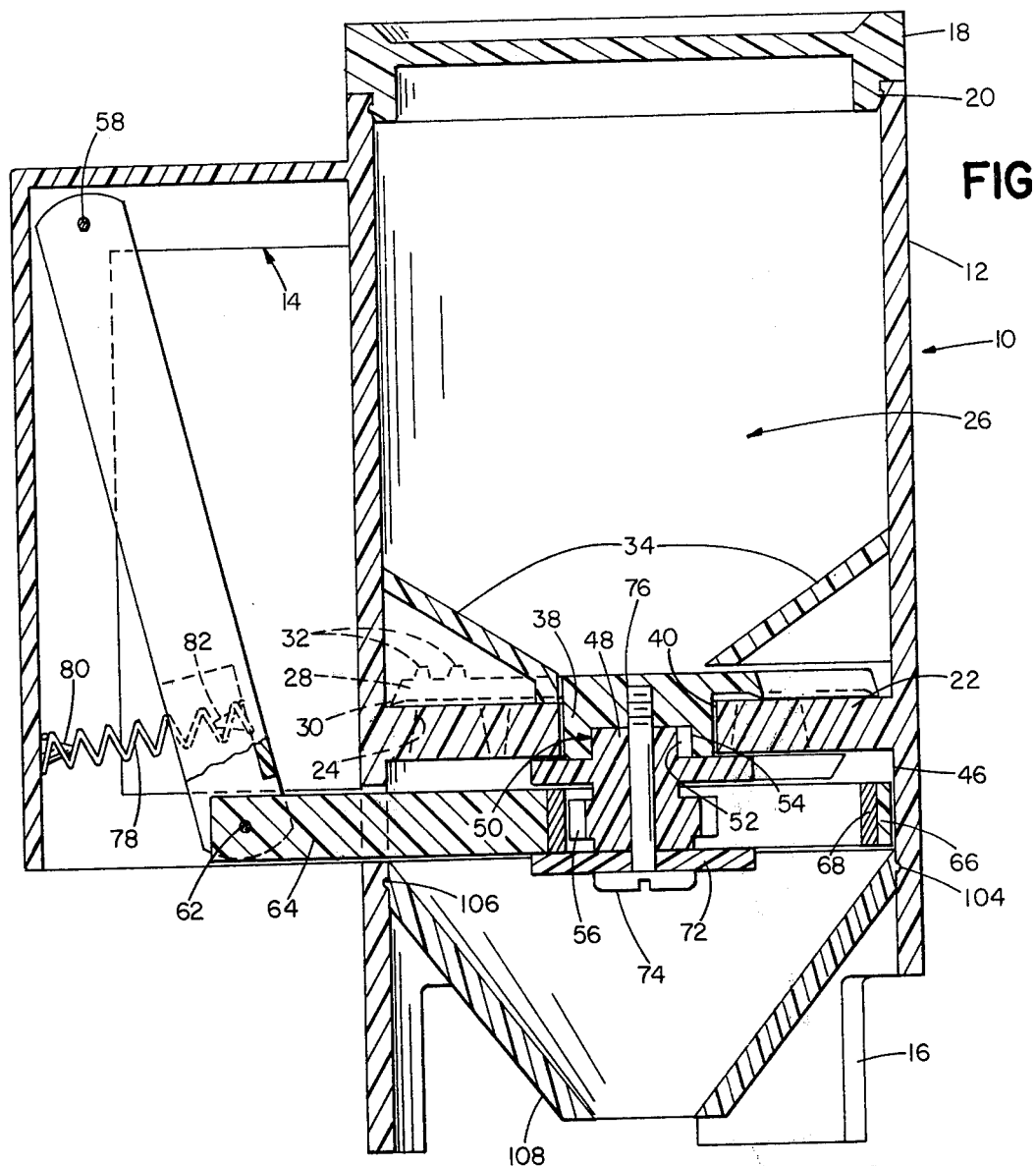
FIG. 3 is a vertical cross-section view of the device of FIG. 1, taken on the line 3—3 of FIG. 4, looking in the direction of the arrows.

Referring first to FIGS. 1–3, the preferred embodiment shown has a body designated generally 10 formed by a cylindrical wall 12 which houses the material container and dispensing mechanism. A handle designated generally 14 is welded or otherwise secured to wall 12 and the device rests on the base of wall 12 when not in use, which may be cut away to form feet 16 as shown. A removable cover 18 has a depending lip 20 which fits inside the top of wall 12 to close that end of body 10.

A transverse wall member to which may be integral with, welded or otherwise secured sto the inside of wall 12, has a series of apertures (five shown) extending through it (FIG. 2) arranged in an arc of somewhat less than 180° near the circumference of wall member 22 to form the measuring compartments 24. Compartments 24 are of dimensions such that each holds a predetermined quantity of the material to be dispensed from the portion of the body 10 above it which forms the container 26. These dimensions may all be the same, as shown, for dispensing regular additive quantities (e.g., ¼ to 1 ¼ teaspoons) or some or all of the compartments may be of different dimensions for dispensing irregular additive quantities (e.g., ¼, ⅓, ½, ⅔, 1 tablespoon). As shown, and preferably, the sides of compartments 24 are slightly divergent from top to bottom to insure adequate dispensing of light granular materials, and for the same reason should have a minimum width of at least ¼th inch. Whether or not of the same capacity, the compartments have a shape such that their sides are radial to, or otherwise uniformly related to, the axis of wall 12, and are uniformly spaced apart.

Mounted above wall member 22 is a barrier member 28 in the form of an arcuate segment plate having a down-turned peripheral sharp edge 30 about its margin which slides on wall member 22. Member 28 is wider than the segment of plate 22 containing the compartments 24 by the width of a compartment, and its side edges are radial to the axis of wall 12 and plate 22. Member 28 has a pair of upstanding diamond shaped projections 32 which serve to agitate and keep loose the granular material in the container area immediately above it when it is moved.

Container 26 has a false bottom 34 which overlies wall member 22, except for the segment containing compartments 24 and barrier member 28, when in its position of FIGS. 2 and 3 in which it closes all the tops of compartments 24. Bottom 34 is scoop or funnel shaped so as to cause the granular material in the container above it to slide toward the area of wall member 22 it does not cover. Bottom 24 may be attached to, or inserted with a tight fit into, wall 12. Its lower edge portion 36 at the left in FIG. 2 is spaced above member 22 sufficiently to permit barrier member 28 to slide under it on wall member 22 when rotated clockwise from its position in FIG. 2, until projections 32 engage it. The part of the lower edge of bottom 34 that does not overly member 28 in any of the adjusted positions of the latter may be flush with the top of wall member 22.

Barrier member 28 has a central shaft 38 which may be integral as shown and extends downwardly through a central aperture 40 in wall member 22. A bottom closure member 46 has a central shaft 48 integral therewith or fixed thereto, the upper part of which fits within a socket 50 provided in the lower end of shaft 38, and has a projecting rib 52 which fits within a groove 54 in the side wall of socket 50 to provide a predetermined axial relationship between members 28 and 46. Member 46 is similar in shape and size to member 28 and, with rib 52 positioned in groove 54, they are positioned about the axis of wall 12 so that they overlap by one width of a compartment 24 in the axial direction.

Figures 4, 5:
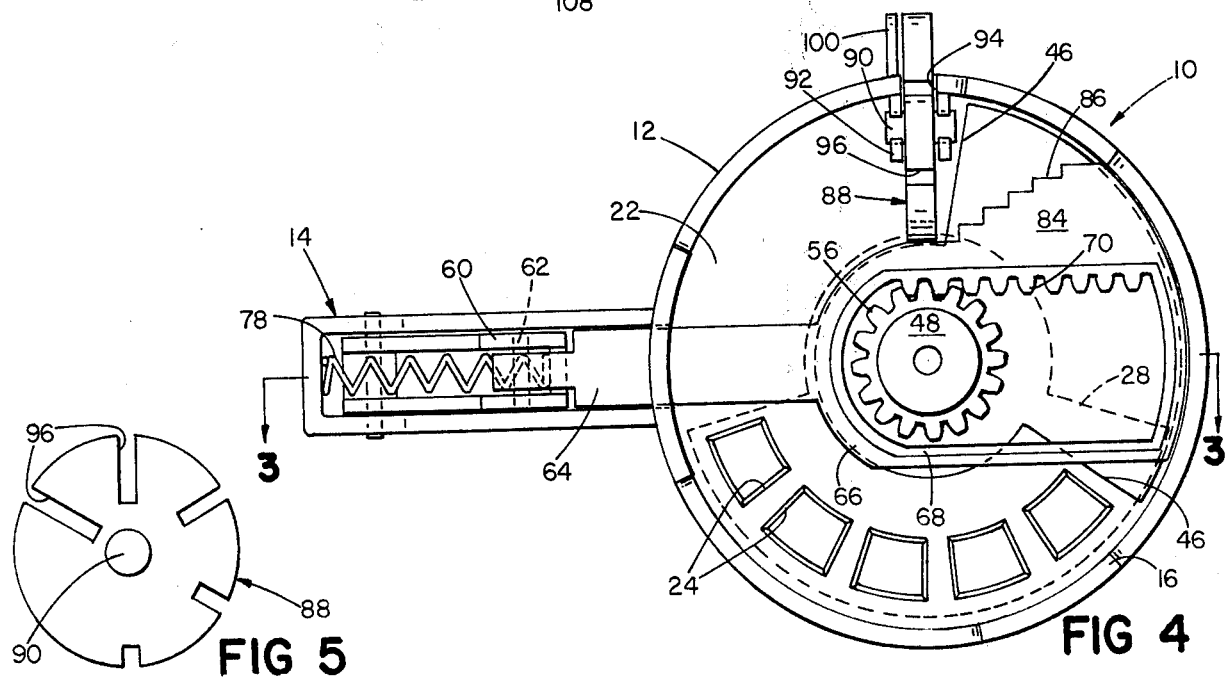
FIG. 4 is a bottom plan view of part of the device of FIG. 1.
FIG. 5 is a side elevation view of part of the device of the previous Figures.

Shaft 48 below member 46 has fixed thereto an external gear 56. Handle 14, which is of U-shaped cross-section in its top horizontal and vertical portions, has a pivot pin 58 fixed to its upper side walls on which is pivoted one end of a lever 60. The other end of lever 60 is pivotally connected by pivot pin 62 to one end of an arm 64. Lever 60 is U-shaped and pivot pin 62 is fixed to its two sides and extends through an aperture in a reduced extension of arm 64 as shown in FIG. 4. Handle 14 is open at top and bottom in its lower horizontal portion, arm 64 fitting slidably between its sides.

Arm 64, which extends through an aperture in wall 12, is formed at its opposite end with an enlargement having a generally rectangular opening with arcuate ends which forms a rack holder 66, in which is removably fitted a complementary shaped rack member 68 with a similar opening having on one of its long internal walls a rack 70 provided with teeth of a size to operate the gear 56. Holder 66 is slidable on a plate 72 secured to the under end of shaft 48 by a bolt 74 extending through plate 72, shaft 48 and into a threaded aperture 76 in shaft 38 to hold together plate 72 and members 46 and 28.

A spring 78 extends into the opposed open sides of U-shaped handle 14 and lever 60 near their lower ends and is received at its opposite ends over a pin 80 on handle 14 and a pin 82 on lever 60. In its normal, expanded position spring 78 maintains the parts connected to it in their positions shown in FIGS. 2, 3 and 4. Rack holder 66 has fixed to one of the long sides defining its opening a stop member 84 having a stepped face 86 facing handle 14 (FIG. 4). An adjustment control disc member 88 has an axial shaft 90 rotatably mounted in supports 92 extending inwardly from wall 12 for rotation about an axis transverse to that of gear 56 and parallel to the direction of sliding movement of holder 66 on disc 72. Member 88 extends partially through a longitudinal opening 94 in wall 12 (FIG. 1), and is provided with a series of slots 96 (FIG. 5) cut into its periphery of different lengths corresponding to the successively increased distances of the steps in stepped face 86 of stop member 84 from the slide axis of holder 66. Stop member 84 is interposed in the direction of sliding movement of arm 64 toward handle 14 from its normal position of FIGS. 2, 3 and 4.

Member 88 is provided on its face nearest handle 14 with indicia 98 (FIG. 1) in the areas between slots 96 indicating the amount to be dispensed according to the length of the slot 96 positioned in the path of movement of member 88. A shield member 100 secured to the outside of wall 12 at the side of opening 94 nearest handle 14 has an opening 102 through which the user may view the indicia corresponding to each setting of adjustment member 88 with a different slot 96 in the path of stop member 84. A ratchet and pawl (not shown) or similar friction clutch device is provided to act on member 88 to releasably maintain it in each of its adjusted positions.

Wall 12 below arm 64 is provided with an inner peripheral groove 104 in which snap-fits a peripheral rib 106 on the large end of a funnel 108. Funnel 108 serves to center the discharge of material from the device, which is dispensed at one side of its axis.

Figure 6A:
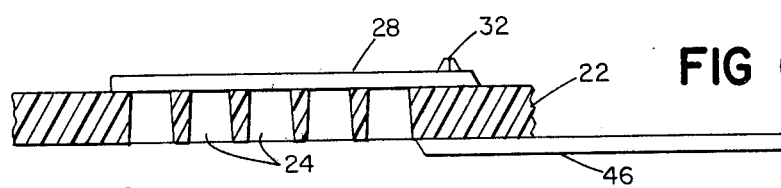
FIGS. 6a, 6b and 6c are diagrammatic views illustrating successive operating positions of certain parts of the device of the previous Figures.
Figure 6B:
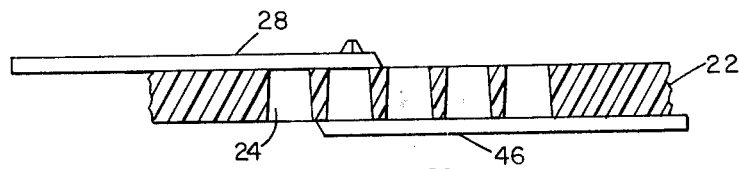
Figure 6C:
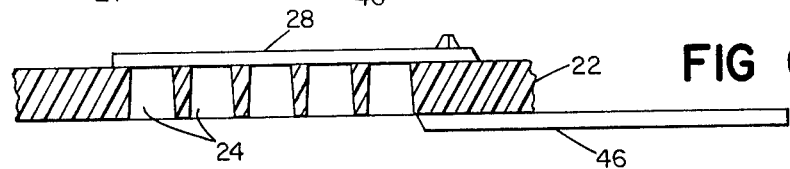

In the arrangement of parts shown, barrier member 28 and closure member 46 are in the normal or idle position, in which the tops of compartments 24 are closed by member 28, and member 46 has been withdrawn from under the compartments so that they are all empty. (See FIG. 2 in which the lefthand end of member 46 can be seen underlying the righthand end of member 28 beyond the rightmost compartment, and FIG. 6a in which this position is diagrammatically shown). The user sets member 88 by turning it with thumb or finger to position the indicia 98 corresponding to the desired quantity to be dispensed in opening 102, assuming change from a previous setting is wanted. In FIGS. 6a to 6c it is assumed that the user wishes to dispense a quantity corresponding to three compartments 24.

The user now holds the device by handle 14 with funnel 108 over the receptacle to which it is desired to dispense the material, and with that hand squeezes lever 60 so that its lower end approaches the vertical shank of handle 14, pulling arm 64 and connected parts with it, until further movement is stopped by engagement of stop member 84 with adjustment member 88. Gear 56 is rotated by rack 70 to turn it and shaft 48, members 46 and 28 in the clockwise direction in FIG. 2 to pivot these members to the position shown in FIG. 6b, in which member 46 has closed the bottoms of four compartments 24 and member 28 has opened the tops of three so that these three are exposed to container 26 for filling. The user waits a sufficient interval to be sure the three compartments have filled, then releases lever 60 so that spring 78 forces the parts to pivot oppositely back to the original position shown again in FIG. 6c. The three filled compartments have now had their bottoms opened and their tops closed so that they dispense the quantity they contain.

In the operation just described, member 88 was set so that its slot 96 at upper right of center in FIG. 5 lies in the path of movement of face 86 of stop member 84. The first two teeth to the left on face 86 in FIG. 4 pass through this slot, while the third tooth engages member 88 beyond the inner end of the slot to stop the movement after four compartment widths. It will be appreciated that the members need to pivot one compartment width more than the number of compartments selected for dispensing. The first stop tooth to the left is arranged so that it will pass through the shortest slot in FIG. 5, producing a pivoting of two compartment widths stopped by engagement of the second tooth with member 88. This first tooth is spaced from member 88 sufficiently so that pivoting of one compartment width takes place before it reaches member 88. If member 88 is not properly adjusted, the first tooth will engage member 88 between slots 96 to prevent filling and dispensing until member 88 is properly adjusted. More than five teeth are unnecessary, since the outer limits of pivoting in either direction may be determined by the length of rack 70 and the ends of the opening in which it lies.

It should be noted that the arrangement of operating linkage shown permits holding and operating the device with one hand. This is important, since the user may need to use the other hand for some other purpose, such as holding a receptacle or stirring its contents.

As earlier stated, a feature of the device is that it can readily be readjusted from the normally empty compartment arrangement shown to a normally full compartment arrangement. To do this, the device is inverted with funnel 108 removed as in FIG. 4. Rack member 68 is pulled out of holder 66 off gear 56 and gear 56 is hand rotated to move members 28 and 46 to the opposite limits of their movement away from their positions in FIG. 2. Rack member 68 is turned 180° about its axis and reinstated in holder 66 with rack 70 now on the opposite side of gear 56 so that it rotates it oppositely from the rotation produced before.

Figure 7A:
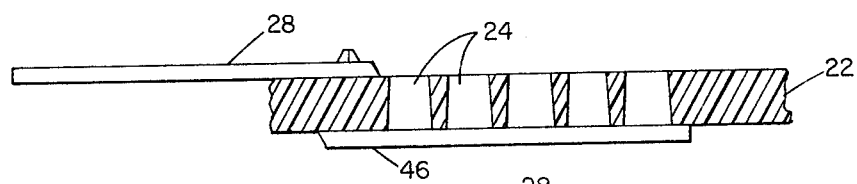
FIGS. 7a and 7b are diagrammatic views illustrating operation of the parts shown in FIGS. 6a–6c of the device shown in the previous Figures modified by rearrangement of certain of its parts.
Figure 7B:
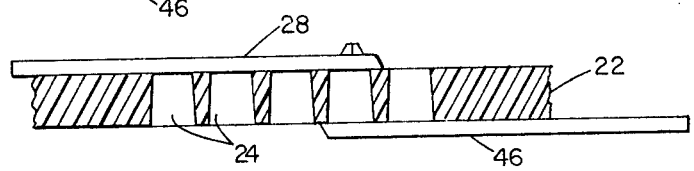

In the normal, idle position member 28 has now uncovered all the tops of compartments 24 while member 46 has closed all their bottoms as shown in FIG. 7a, so that they are all filled. To dispense, adjustment member is set as before, and lever 60 is squeezed. Movement of members 28 and 46 is now in the opposite or counterclockwise direction so that member 28 is moved to close the tops of the first four compartments from the left and member 46 has opened the bottom of the first three, as shown in FIG. 7b. These three, being already filled, dispense without the user having to wait for fill. When lever 60 is released, the parts return to their normal, all compartment filled position of FIG. 7a.

The change from normally empty to normally full could also be effected by disassembling members 28 and 46 and interchanging their respective positions relative to the axis of the device, without changing the rack and gear arrangement. If that were to be done an additional groove 54 would be needed, corresponding in position to the changed position of rib 52 in socket 50. Rearrangement of the rack is simpler and preferred.

All the parts of the device except the spring may be formed of moulded plastic. However, metal, or other material of suitable strength, may be used in fabricating some or all of the parts.

I claim:

1. A device for measuring and dispensing granular material which comprises:

a container for the material having a material discharge outlet opening at the bottom thereof;

dispensing means including a plurality of closely adjacent material receiving compartments open at top and bottom, a barrier member for shielding the tops of said compartments from said outlet opening at one position relative to said compartments, and a closure member for closing the bottoms of said compartments at one position relative to said compartments;

mounting means fixedly mounting said compartments at said outlet opening and mounting said members for reciprocation across the tops and bottoms respectively of said compartments;

reciprocating means for reciprocating said members between a single dispense position in which all of said compartments are shielded at their tops from said outlet opening by said barrier member and are opened at their bottoms by said closure member, and a plurality of fill positions in which selected different numbers of said compartments have the tops thereof exposed to said outlet opening by said barrier member and the bottoms thereof closed by said closure member;

operating means for said reciprocating means accessible from the exterior of the device; and control means adjustable to stop the movement of said members by said operating and reciprocating means at selected fill positions corresponding to said selected numbers, including adjustment means for said control means accessible from the exterior of the device and operable to set said control means to stop said movement at said selected positions, and indicator means showing the compartment capacity to be filled and dispensed at each setting of said adjustment means.

2. A device according to claim 1 wherein said reciprocating means is adjustable relative to said mounting means for also, in the alternative, reciprocating said members between a single fill position in which all of said compartments are exposed at their tops to said outlet opening by said barrier member and are closed at their bottoms by said closure member, and a plurality of dispense positions in which selected different numbers of said compartments have the tops thereof shielded from said outlet opening by said barrier member and the bottoms thereof exposed by said closure member, said control means being thereby rendered adjustable by said adjustment to stop the movement of said members by said operating and reciprocating means at selected dispense positions corresponding to said selected numbers.

3. A device according to claim 1 wherein said members are plates arranged in a fixed relation to each other with an edge of one plate overlapping the edge of the other by the width of a compartment transversely of their path of reciprocation.

4. A device according to claim 1 wherein said members are mounted for reciprocal pivoting about an axis.

5. A device for measuring and dispensing granular material which comprises:

a container for the material having a material discharge outlet at the bottom thereof;

a plurality of closely adjacent material receiving compartments fixedly mounted at said outlet to receive material therefrom, said compartments being open at top and bottom;

a barrier member reciprocally movable between the open tops of said compartments and said outlet to close or open their tops to said outlet;

a closure member reciprocally movable beneath the open bottoms of said compartments to close or open their bottoms;

operating means accessible from the exterior of the device for reciprocating said members so that on movement thereof in one direction said barrier member closes the top of each successive compartment before its bottom is opened by said closure member, and on movement thereof in the opposite direction said closure member closes the bottom of each compartment before its top is opened by said barrier member;

control means accessible from the exterior of the device and adjustable to stop the movement of said members at the successive positions of registry of said members with the successive compartments; and a handle connected to said device by which the device may be supported with one hand grasping the handle, said operating means having an operating member arranged for operation by the hand grasping said handle.

6. A device according to claim 5 wherein said operating member is a lever associated with said handle for movement toward and away from said handle, and a spring is connected to said lever to oppose movement thereof toward said handle.

7. A device for measuring and dispensing granular material which comprises:

a container for the material having a material discharge outlet at the bottom thereof;

a plurality of closely adjacent material receiving compartments fixedly mounted at said outlet to receive material therefrom, said compartments being open at top and bottom;

a barrier member reciprocally movable about an axis between the open tops of said compartments and said outlet to close or open their tops to said outlet;

a closure member reciprocally movable about an axis beneath the open bottoms of said compartments to close or open their bottoms;

operating means accessible from the exterior of the device for reciprocating said members about said axis so that on movement thereof in one direction said barrier member closes the top each successive compartment before its bottom is opened by said closure member, and on movement thereof in the opposite direction said closure member closes the bottom of each compartment before its top is opened by said barrier member; and control means accessible from the exterior of the device and adjustable to stop the movement of said members at the successive positions of registry of said members with the successive compartments.

8. A device according to claim 7 wherein said operating means includes a gear connected to pivot said members about said axis, and means for rotating said gear in opposite directions.

* * * * *

UNITED STATES PATENT AND TRADEMARK OFFICE
CERTIFICATE OF CORRECTION

PATENT NO. : 4,006,842
DATED : February 8, 1977
INVENTOR(S) : Anthony L. Bassignani It is certified that error appears in the above-identified patent and that said Letters Patent are hereby corrected as shown below:

Column 3, line 40, after "member", delete "to" and add --22,--;

Column 3, line 41, after "secured", change "sto" to --to--;

Column 6, line 37, "reinstated" should be --reinserted--;

Column 8, line 52, after "top", insert --of--.

Signed and Sealed this

Twelfth Day of April 1977

[SEAL]

Attest:

RUTH C. MASON
Attesting Officer

C. MARSHALL DANN
Commissioner of Patents and Trademarks